March 19, 1935.  R. BEDELL  1,995,111
BRAKE STRUCTURE CARRIER
Filed July 18, 1932   3 Sheets-Sheet 1
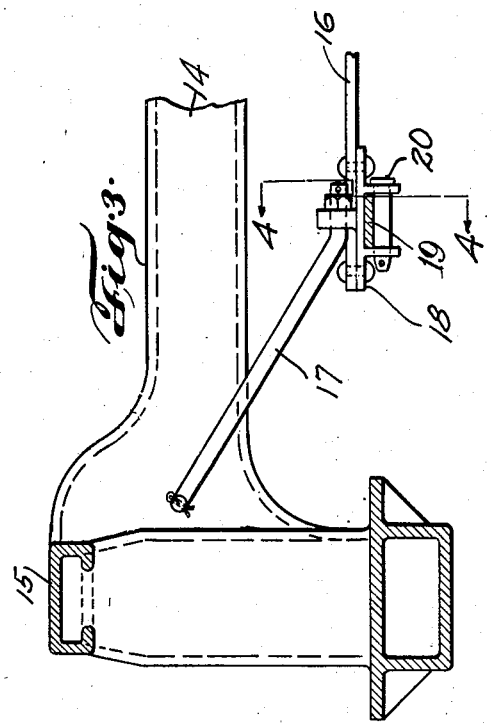
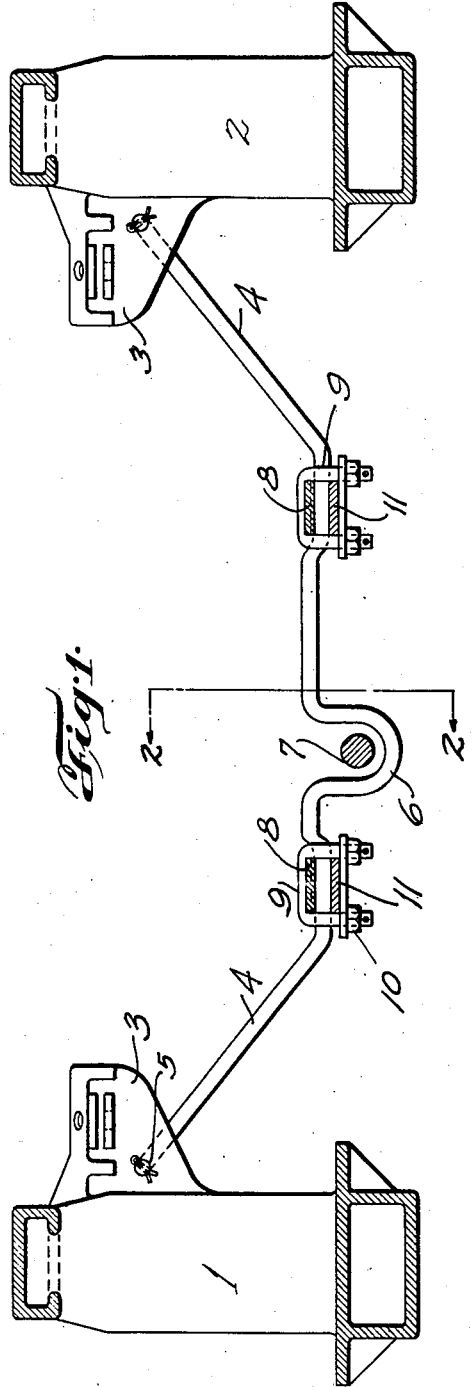
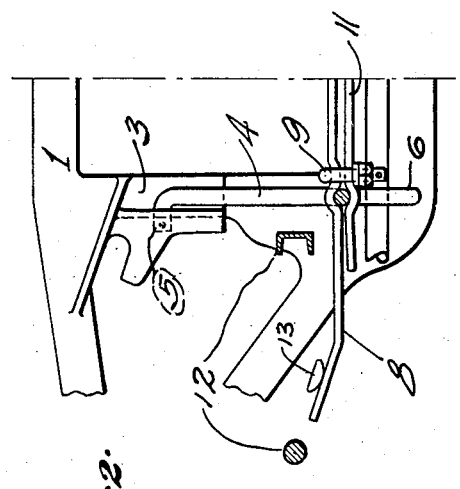
Inventor
Rodney Bedell

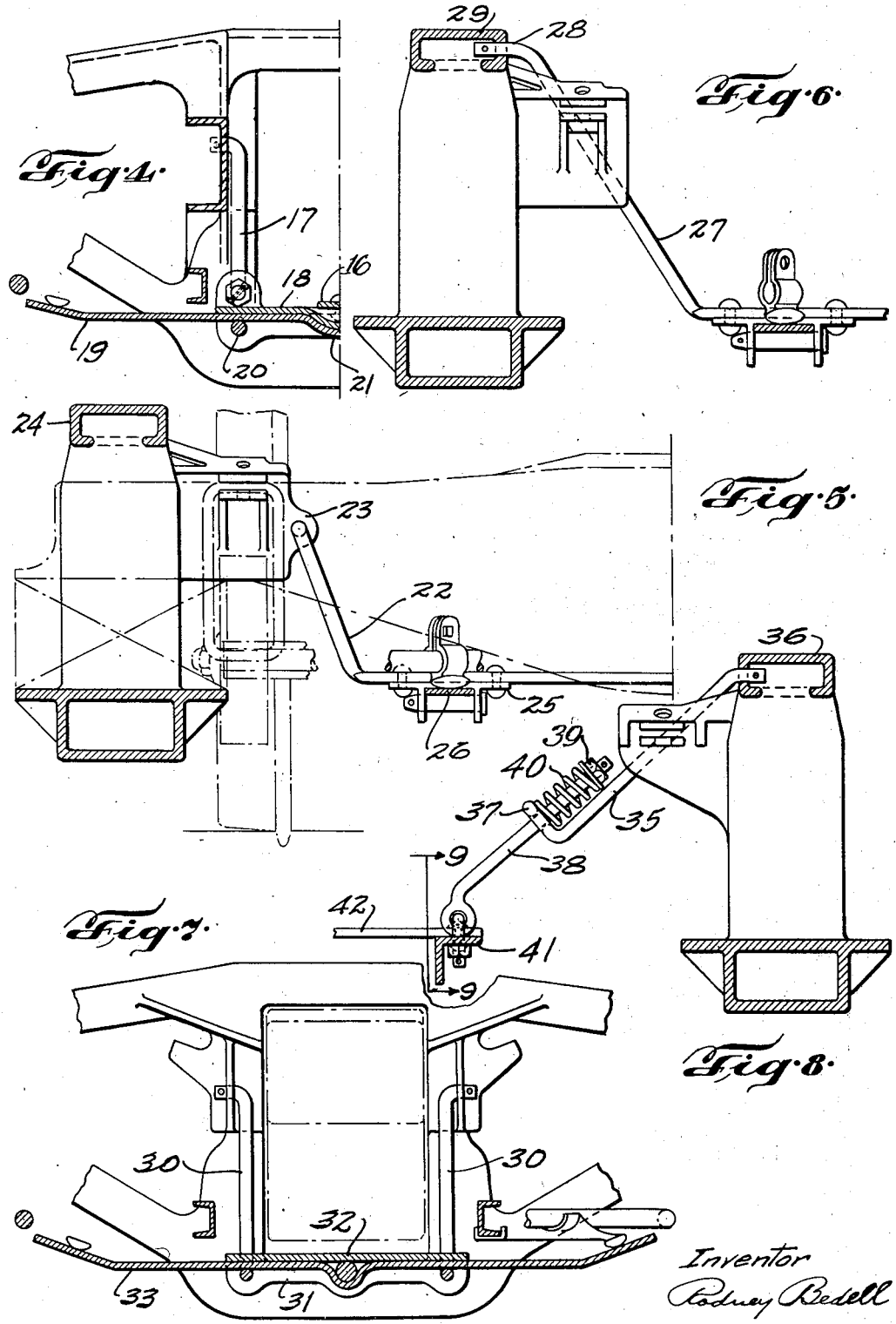

March 19, 1935.  R. BEDELL  1,995,111
BRAKE STRUCTURE CARRIER
Filed July 18, 1932   3 Sheets-Sheet 3
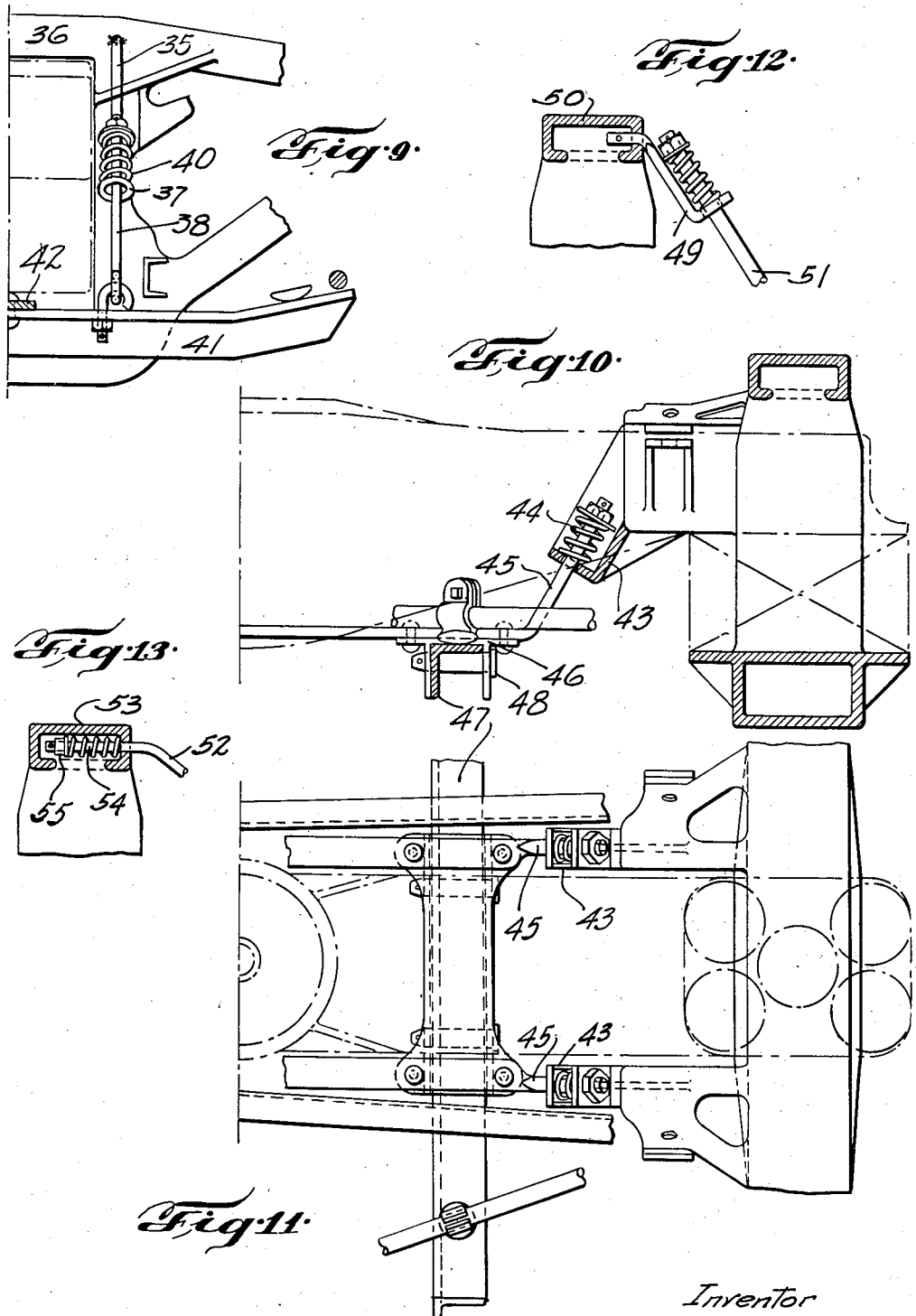
Inventor
Rodney Bedell Patented Mar. 19, 1935

1,995,111

UNITED STATES PATENT OFFICE 1,995,111

BRAKE STRUCTURE CARRIER

Rodney Bedell, Webster Groves, Mo., assignor to Chicago Railway Equipment Company, Chicago, Ill., a corporation of Illinois Application July 18, 1932, Serial No. 623,148

20 Claims. (Cl. 188—213)

The invention relates to railway truck structure and consists in novel means for mounting the brake beam guard, guide or support member and/or a bottom connection rod, or any similar equipment which it is desired to support at a level adjacent to the rail.

Briefly, the invention consists in a carrier extending transversely of the truck and supported by the upper portions of the truck framing or associated parts at the sides of the truck.

Devices having a similar function have been suggested heretofore in the form of brackets extending inwardly from the lower portion of the truck side frame, and in the form of members rigidly secured to various parts of the truck side frame and extending inwardly therefrom.

One object of the present invention is to eliminate brackets formed integral with, or extending horizontally inwardly from, the lower portion of the truck side frames, thereby avoiding the expense of relatively heavy cast members and the likelihood of loss due to fracture.

Another object of the invention is to provide a carrier of the class described which will be cheap, effective, and easily applied to, or removed from, the truck when it is desired to inspect or dismantle any part of the brake structure with which the device is associated.

Other detail objects of the invention will be apparent from the following description and inspection of the accompanying drawings, in which—

Figure 1 is a vertical transverse section through the opposite sides of a truck showing the novel carrier applied thereto.

Figure 2 is a vertical section taken longitudinally of the truck approximately on the line 2—2 of Figure 1.

Figure 3 is a section corresponding to Figure 1 but showing one side of the truck only and illustrating a modified form of the invention.

Figure 4 is a section taken approximately on the line 4—4 of Figure 3.

Figures 5, 6, 8, and 10 are sections corresponding to Figure 3 but illustrate other forms of the invention.

Figure 7 is a vertical section extending longitudinally of the truck and illustrating another form of the invention.

Figure 9 is a section taken approximately on the line 9—9 of Figure 8.

Figure 11 is a top view of the structure shown in Figure 10.

Figures 12 and 13 are detail sections through the upper portion of truck side frames illustrating other modifications.

In the structure shown in Figures 1 and 2, the opposite side frames of the truck are indicated at 1 and 2 respectively, and each is shown provided with a brake hanger bracket 3. The carrier device comprises a pair of round rods 4, each having its ends 5 bent to extend through perforations in one of the brackets 3. Each rod extends diagonally downwardly and inwardly from the supporting brake hanger brackets to points adjacent the level of the lower portion of the side frame, and the intermediate portion of the device extends transversely of the truck substantially horizontally but is formed with an intermediate loop 6. Loops 6 are adapted to underlie a bottom connecting rod 7 and to serve as a safety guard for the latter in the event of the failure of one of the pins by which it is connected to the brake levers, or in the event of failure of the brake lever suspension. Flat bars 8, preferably of flexible material, form fourth point guard, guide or support members for the brake beams and each is attached to the carrier device by means of the U bolts 9, nuts 10, and a reinforcing or clamping bar 11. Bars 8 extend longitudinally of the truck, being supported at spaced points by the carrier devices 4, and extend outwardly beyond the same beneath the brake beam indicated at 12 which is provided with a chair 13 of familiar type for engagement with the guard, guide or support member 8.

The structure shown in Figures 3 and 4 includes truck transoms 14 extending between the side frames 15 and the carrier device includes a single intermediate bar 16 and a pair of inclined connections 17 supporting each end thereof and having their upper ends hooked into the walls of the transoms 14. A bracket member 18 is supported by each pair of connections 17 and the bracket members at opposite sides of the truck are tied together by the bar 16. A brake beam guard, guide or support member 19 is mounted in the bracket 18 by means of the pins 20, and preferably the member and bracket are provided with nested indentations 21 to prevent the longitudinal movement of the member in the bracket.

The structure of Figure 5 illustrates a continuous carrier member 22 having round end portions hooked into the brake hanger brackets 23 on the side frames 24 and having the intermediate portion flattened for the attachment of the bracket 25 in which the brake beam guard, guide or support member 26 is secured.

Figure 6 illustrates a carrier device 27 similar to that shown in Figure 5 but shows the upper end 28 of the same as projecting through the side wall of the top member 29 of the side frame instead of through a transom or brake hanger bracket as previously described.

Figure 7 illustrates a modification in which the carrier rods 30 extend through the flanges 31 on the brackets 32 and engage the undersides of the guard, guide or support members 33 thereby taking the place of the pins referred to above.

In all of the above forms, the carrier device is substantially rigid from end to end and the brake beam guard, guide or support member is preferably a flexible flat bar adapted to yield when abnormal load is applied thereto.

Figures 8 and 9 illustrate a structure in which the carrier device is arranged to yield under abnormal load and the brake beam guard, guide or support member is rigid. In this form the inclined end portions of the carrier device each comprises an upper element 35 hooked into the upper chord 36 of the side frame with its lower end forming an eye 37 extending transversely of the length of the element. The lower element 38 extends through the eye 37 and is provided with a nut 39 at its upper end forming a seat for a coiled spring 40 which is compressed between eye 37 and nut 39 and yieldingly supports the brake beam guard, guide or support member 41 which is in the form of an angle iron hooked onto the lower end of element 38. The assembly at the sides of the truck are held in spaced relation by a tie 42.

Figures 10 and 11 show a side frame with brake hanger brackets each having a depending shelf 43 adapted to seat a coiled spring 44 which supports the carrier rod 45 extending downwardly and transversely of the truck to the opposite side thereof. The two carrier rods cooperate in mounting a bracket 46 at each side of the truck in which the brake beam guard, guide or support angle 47 is secured by pins 48.

Figure 12 shows a yielding form of carrier device in which the upper element 49 extends through a wall of the side frame 50 and the lower element 51 is spring-seated in a manner similar to that shown in Figure 8.

Figure 13 shows a method of adjustably mounting the upper ends 52 of a carrier device in the top member 53 of the side frame by inserting a coiled spring 54 between the inner wall of the frame and a nut 55. This arrangement will accommodate variations in the length of the carrier device or the play of the truck frames and will tend to prevent any rattling of the carrier mounting. It will be understood that the intermediate parts of the devices indicated in Figures 12 and 13 may correspond to those shown in any of the forms more completely illustrated.

Each of the carrier devices may be arranged to include the bottom connection safety guard as shown in Figure 1 and it is obvious that the carrier device may mount a single third point brake beam guard, guide or support member instead of mounting spaced fourth point members.

Various other arrangements of a carrier device of the class described extending across the truck and supported at its end by the upper portions of the truck frame will suggest themselves to those skilled in the art and the exclusive use of those modifications coming within the scope of the claims herein is contemplated.

What is claimed is:

1. A carrier of the class described comprising elements arranged for attachment respectively to the upper portions of the opposite side parts of a truck frame and extending downwardly therefrom, and a member extending between the lower portions of said downwardly extending elements and arranged for supporting, guarding or guiding a brake member located in proximity to the rail upon which the truck travels.

2. A carrier of the class described comprising a device having an intermediate part disposed substantially horizontally and arranged to support, guard or guide a brake member, and an individual part extending upwardly and outwardly from each of the opposite ends of said intermediate part for attachment to the upper portions of the opposite side parts of a railway truck frame.

3. A carrier of the class described comprising a part disposed substantially horizontally for attachment to horizontally spaced brake beam guard, guide or support members, and parts extending upwardly and outwardly from said first-mentioned part for attachment to the upper portions of opposite side parts of a railway truck frame.

4. A carrier of the class described comprising a part adapted to engage a brake structure in a railway vehicle truck and positioned in proximity to the rail upon which the truck travels, and yielding means for suspending said part from the upper portions of the sides of the truck frame.

5. In a railway truck, frame elements at opposite sides of the truck, brake structure, and a carrier or safety guard for said structure depending from the upper portions of said elements and extending across the truck at approximately the level of said structure.

6. In a railway truck, frame members at opposite sides of the truck, a carrier device depending from the upper portions of said members and extending across the truck at the level of the lower portion of the truck frame, and a brake beam guard, guide or support member mounted on said device.

7. In combination, a railway truck frame including members at opposite sides of the truck, a carrier device depending from the upper portions of said members and extending across the truck at substantially the level of the lower portion of the truck frame, and a brake lever bottom connecting rod extending over said carrier device.

8. In a railway truck, frame elements at opposite sides of the truck, brake structure and a carrier for said structure depending from the upper portions of said elements with a horizontally disposed part extending across the truck and having a depending loop intermediate its ends, brake beam guard, guide or support members mounted near the ends of said portion, and a brake lever bottom connecting rod extending through said loop.

9. In a railway truck, side frames including brake hanger brackets, a carrier with its end portions attached to said brackets and with its intermediate portion suspended from said end portions, and a brake beam guard, guide or support member mounted on said intermediate portion.

10. In a railway truck, side frames each including brake hanger brackets spaced longitudinally of the truck, a carrier extending from each bracket downwardly and then transversely of the truck and then upwardly to the corresponding bracket on the opposite side of the truck, and a brake beam guard, guide or support member extending longitudinally of the truck and attached to said carrier.

11. In a railway truck, side frames, brake beams, a pair of carriers with their end portions attached to the upper parts of said frames and with their intermediate portions disposed below the level of said end portions, and a brake beam guard, guide or support member extending longitudinally of the truck and secured to said carrier intermediate portions.

12. In a railway truck, side frames having perforated webs at the upper portions of their middle parts, and a carrier with its ends projecting through said perforations and intermediate its ends being disposed to mount brake beam structure located adjacent the level of the lower portion of said frames.

13. In a railway truck, side frames, brake beams, a guard, guide or support member for said beams, and means for carrying said member comprising an element attached thereto and extending transversely of the truck, and upward extensions on said element spring supported on the upper portions of said side frames.

14. In a railway truck, side frames, a transom connecting said side frames, and a carrier for brake structure suspended from the ends of said transom and extending across the truck below the level of the bottom of said transom.

15. In a railway truck, side frame members including brake hanger bracket members, a carrier with its end portions carried by one of said members on each side and with its intermediate portion yieldingly suspended from said end portions, and a brake beam guard, guide or support member mounted on said intermediate portion.

16. In a railway truck, a frame including side members and transoms extending between said side members, and a carrier device for brake structure comprising elements suspended from the upper portions of the sides of said truck frame and extending downwardly and across the truck and having a portion below the level of said transoms.

17. In combination, a railway truck frame and a carrier device comprising spaced elements attached to the upper portion of each side of said frame and extending downwardly and inwardly from the point of attachment, a bracket suspended by each pair of said elements, a tie bar extending between the brackets suspended by each pair of elements, and a brake beam guard, guide or support member mounted in each of said brackets and extending longitudinally of the truck.

18. In a railway truck, spaced side frame members, a brake beam guard, guide or support device between the same, and tension elements pivoted to said members and supporting said device.

19. In a railway truck, spaced side frame members, a brake beam guard, guide or support device between the same, and supporting elements for said device projecting from each side of said device and adjustably connected to said side members.

20. In a railway truck, a frame including side and transverse members, and a brake beam guard, guide, or support device of relatively light construction located below the level of said transverse members with its end portions supported directly from the upper portions of both of said side members.

RODNEY BEDELL.